UNITED STATES PATENT OFFICE 2,661,243

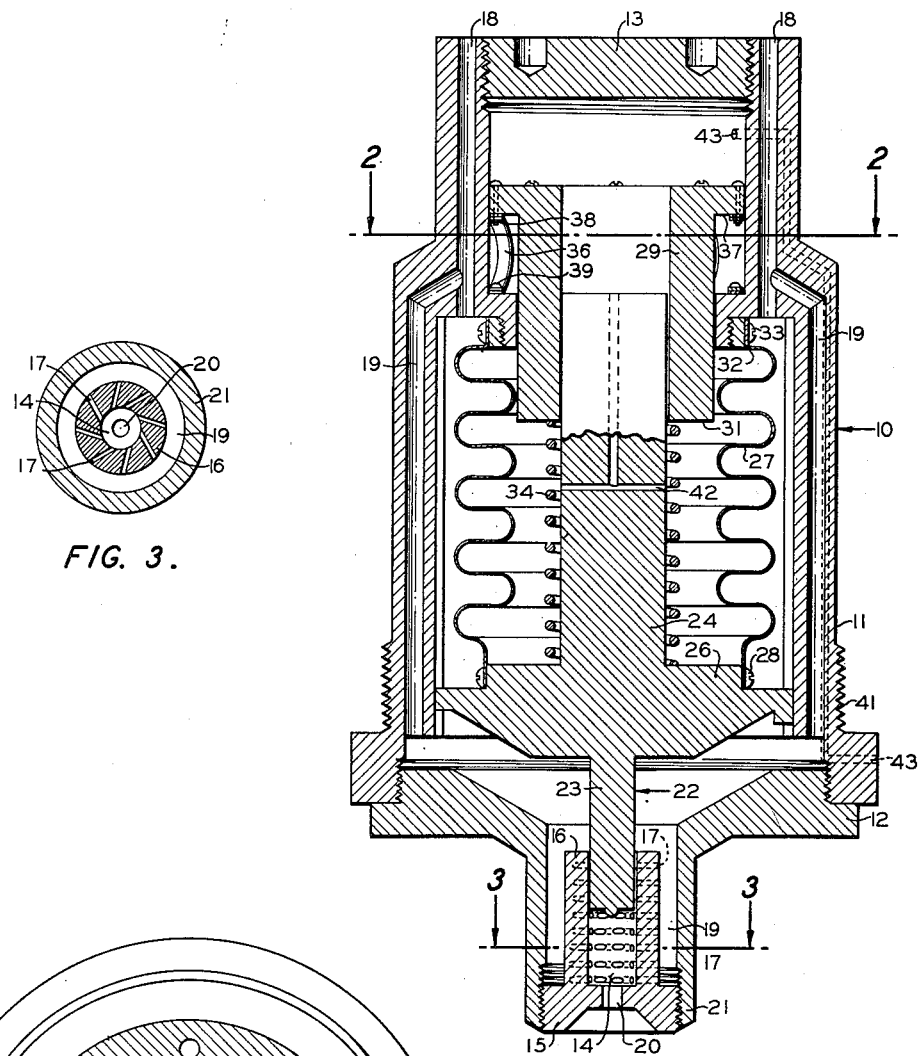

VISCOSITY COMPENSATING VARIABLE-AREA FUEL NOZZLE

Homer M. Fox, Bartlesville, Okla., assignor to Phillips Petroleum Company, a corporation of Delaware Application January 2, 1951, Serial No. 203,994

5 Claims. (Cl. 299—118)

This invention relates to the injection of liquid fuels into an internal combustion chamber. In one of its more specific aspects it relates to an improved variable-area nozzle for the injection of liquid fuel into a gas turbine engine.

Jet engines have only in the last few years been used in large numbers for the purpose of propelling aircraft and they have been found to be highly advantageous for use in high speed planes. With the increase in use of such engines, however, a multitude of operational problems have also come to be recognized.

A jet engine comprises three general parts; first, an air intake section; second, a fuel addition and combustion section; and third, an exhaust section. In a turbojet engine, the air intake section and means for effecting such air intake employs a rotating compressor, such as a turbine compressor, operated by a gas turbine as motivating power for introducing the air into the combustion section. The purpose of operation of such an engine is to burn the fuel and to utilize as much as possible of the heat energy added in producing thrust for the engine. In the gas turbine engine, the combustion gases pass through a turbine which utilizes part of the heat energy in the gas engines in driving the compressor so as to furnish additional air for the combustion zone. The gases then are exhausted to the atmosphere through the exhaust section or tail pipe with a concomitant production of thrust.

Performance of a jet engine is dependent to a large extent upon the "temperature rise" which is obtainable in the particular engine. "Temperature rise" is that increase in temperature between the inlet to the combustor and the temperature of the gases in the combustor exhaust outlet. For each engine speed at a given altitude, a certain temperature rise is required for the operation of any given jet engine. Combustor inlet pressure, fuel atomization, and mass air flow through the engine imposes a limitation upon the combustion of any fuel utilized in the operation of the engine. For each combination of fuel atomization, combustor inlet pressure, and mass air flow, there exists for any given fuel a maximum attainable temperature rise which depends upon the combustion stability performance of that fuel under the combination of these conditions. As the operation conditions become more severe, a decrease in combustion stability is encountered. One phenomenon which tends to affect temperature rise in any given engine is known as "cycling." Cycling is an indication of instability of combustion of a given fuel. The flame front within the combustor tends to fluctuate back and forth and many times the instability reaches such a degree that the flame is finally extinguished. The point at which combustion will no longer be sustained is known as the "blow-out" or "cut-out" point. Blow-out is the primary controlling characteristic of jet engine performance since it defines the thrust output limits at a given altitude.

Various types of pressure injection nozzles have been proposed for introducing liquid fuel into a combustion chamber of a jet internal combustion engine. One such injection nozzle is the pressure-type atomizing nozzle for delivering atomized liquid fuel into the chamber, i. e., as a spray of small liquid droplets. One type of pressure-type injection nozzle is known as a fixed-area nozzle of the vortex-type, into which the liquid is introduced through a fixed opening and then discharged into the combustion chamber through a fixed discharge orifice. In the operation of the fixed-area nozzle the fuel inlet pressure, i. e., the pressure at the point of introduction of fuel into the fixed opening, is regulated to permit the requisite quantity of fuel to be passed through the nozzle and to be injected into the engine. However, the combustion stability is dependent on the degree of atomization of fuel ejected from the nozzle which is in turn affected by change in fuel inlet pressure, the degree of atomization apparently being a function of the pressure drop across the fixed opening. The pressure drop across such an opening necessary for delivering large amounts of the fuel is often so high as to cause combustion instability as a result of too high a degree of fuel atomization, sometimes resulting in "blow-out," i. e., extinguishment of the flame. On the other hand, that pressure drop necessary for delivering relatively small amounts of liquid fuel is so small as to cause combustion instability as a result of too low a degree of atomization. Under these conditions combustion efficiency is entirely unsatisfactory, and a loss in power is obtained that cannot be tolerated.

More recently a modified or "variable-area" type fuel injection nozzle has been developed. This nozzle has a fixed discharge orifice and differs from the fixed-area type inasmuch as the available area of the set of openings for admitting liquid fuel into the vortex chamber is varied by a pressure sensitive means, in response to fuel inlet pressure, so that a predetermined relatively constant pressure drop is maintained across the openings regardless of the quantity of fuel to be injected into the vortex chamber, thereby providing for a satisfactory degree of fuel atomization under selected operating conditions.

In operating aircraft gas turbine and/or jet engines in flight, temperatures to which the fuel supply are exposed vary extensively, particularly as a function of the change in altitude. These temperature changes are manifest in their relation to fuel viscosity, which varies inversely with temperature. When operating a variable-area fuel injection nozzle of the type described, an increase in liquid fuel viscosity requires a higher fuel pressure for maintaining the requisite pressure drop so as to continue to deliver the needed amount of fuel into the nozzle for injection into the engine. I have found that the variable-area injection nozzle described, in response to an increased fuel viscosity does not satisfactorily permit the necessary increase in pressure drop to take place, but instead provides for more inlet area tending to prevent development of such required increase in pressure drop, as a result of which the pressure drop of the more viscous liquid across the openings is unduly low and atomization of fuel is seriously impaired. Similarly the converse is true with respect to a decrease in viscosity of the fuel.

I have found that the variable-area type injection nozzle described above can be utilized quite satisfactorily at a constant or nearly constant fuel viscosity. However, when encountering the broad range of temperatures as described with the concomitant effect on fuel viscosity, the pressure sensitive means prevents the necessary change in fuel pressure to take place that is needed when the fuel viscosity changes. The variable-area nozzle is not adapted to automatically regulate fuel pressure in response to change in fuel viscosity, so as to alter the effect that it (the variable-area nozzle) ordinarily has in responding to change in fuel pressure at a constant or nearly constant fuel viscosity. My invention is concerned with a means for effecting a greater efficiency and engine performance when employing a variable-area fuel injection nozzle of the type described, under conditions of varying liquid fuel viscosity, than has been possible heretofore, and is further concerned with providing improved engine startability.

An object of this invention is to provide for injection of liquid fuel into the combustion chamber of an internal combustion engine. Another object is to provide an improved fuel injection nozzle. Still another object is to provide improved combustion efficiency and engine performance when employing a variable-area fuel injection nozzle, in the operation of a gas turbine engine, or of a jet engine, under conditions of varying liquid fuel viscosity. Still another object is to provide a viscosity compensating variable-area fuel nozzle. Other objects will be apparent to one skilled in the art from the accompanying discussion and disclosure.

In accordance with my invention, I have provided an improved fuel injection nozzle of the variable-area vortex-type affording improved atomization of fuel under conditions of varying fuel viscosity. My invention is further described and illustrated with reference to the attached diagrammatic drawings. It is to be understood that my invention is not to be limited to the drawings but that the drawings can be altered in many respects by those skilled in the art and still remain within the intended scope of my invention.

Figure 1 is a cross sectional view of one form of viscosity compensating variable-area fuel nozzle of my invention. Figure 2 is a cut-away view of Figure 1 taken along the line 2—2, particularly illustrative of one system of temperature sensitive means of my invention. Figure 3 is a cut-away drawing of Figure 1 taken along the line 3—3, particularly illustrative of the manner in which fuel inlet conduits are disposed to introduce liquid fuel tangentially into the vortex chamber.

Variable-area fuel nozzle assembly 10 is illustrated with reference to Figure 1. Housing 11 is closed at one end by closure member 12 and at the other end by closure member 13. Vortex chamber 14 in closure member 12 is formed by cylinder 16 containing in its side walls conduits 17 disposed so as to deliver fuel into chamber 14 tangentially against the inner surfaces thereof. Conduits 18 are disposed in the sidewall of housing 11 for admitting liquid fuel, and are in communication with conduits 17 via conduits 19. Conduits 19 around chamber 14 comprise an annulus formed by the cylinder 16 and by concentric cylinder member 21 in closure member 12, containing closed end 15 and discharge orifice 20 coaxial with chamber 14. A piston-type valve 22 comprises piston 23 axially disposed in chamber 14 and axially movable therein, and valve stem 24 together with bellows closure member 26 as described hereafter. A pressure sensitive bellows 27 is disposed within housing 11 coaxial with piston 23 and connected at one end with piston 23 via its closure member 26, attached and sealed to member 26 by fastening means 28, so as to prevent communication of the interior of bellows 27 with conduits 18 and 19. Lipped collar-guide 29 is disposed in housing 11, axially with respect to piston 23 and bellows 27, and is adapted by its lipped portion to be guidably supported in a part of housing 11 spaced away from bellows closure 26. Collar-guide 29 is further adapted to be moved axially in housing 11, and encompasses stem member 24 so as to guide the movement of valve assembly 22 in an axial direction. The end 31 of collar-guide 29 is encompassed by bellows 27. The end 32 of bellows 27 is secured by fastening means 33 to housing 11 and sealed to prevent communication of the interior of bellows 27 with conduits 18 and 19. Helical spring 34 in bellows 27 is axially disposed therein in contact with end 31 of collar-guide 29 at one end, and at the other end with closure member 26 of bellows 27. Temperature sensitive element 36 is secured to the underside 37 of the lipped portion of collar-guide 29 and to housing 11 by fastening means 38 and 39, respectively. In this manner temperature sensitive element 36 expands or contracts as the case may be in response to any temperature change taking place in conduits 18 and is thereby adapted to cause collar-guide 29 to move in an axial direction, which in turn alters the tension on helical spring 34 resulting ultimately in an adjustment of the position of piston 23 in chamber 14 as described hereafter. Thread means 41 is provided to secure the assembly 10 in the side wall of a combustion chamber. The interior of bellows 27 is maintained in communication with the interior of such a combustion chamber by conduits 42 and 43.

Figure 2 further illustrates the manner in which the fuel inlet conduits 18 are disposed in housing 11 and also serves to illustrate one manner in which temperature sensitive elements 36 are disposed in housing 11.

Figure 3 is further illustrative of the manner in which the fuel inlets 17 are disposed to introduce fuel into vortex chamber 14 in a direction tangent to the inner wall thereof.

Temperature sensitive element 36 can be any suitable temperature sensitive means and is preferably a compound bar-type, generally a bimetallic strip which consists of two sheets of metal, one of relatively high and the other of relatively low coefficient of expansion, laminated by welding, brazing, soldering, or even riveting. Bimetallic strips particularly suitable for use in the practice of my invention include brass-iron, Monel-iron, and the like. The bimetal strip can be used in the form of a coil, spiral, or helical, or preferably as the curved member specifically illustrated in Figures 1 and 2. In any case, the bar or strip will bend or curl when subjected to temperature change because of the unequal expansion of the metals.

The variable-area type injection nozzle developed prior to my invention was substantially the structure illustrated except for the structure relating to collar-guide 29, temperature sensitive element 36, and the association of these elements with spring 34 and bellows 27. The prior valve provides for delivery of fuel from conduits 19 into chamber 14 at a substantially constant fuel pressure by means of pressure sensitive bellows 27 augmented by spring 34. In the operation of that valve, bellows 27 in response to an increase in fuel pressure necessitated by an increased fuel requirement, contracts causing piston 23 to rise in chamber 14. In this manner, dependent on the amount of fuel required for delivery into chamber 14, piston 23 is raised to permit the availability of a larger number of conduits 17 to maintain a substantially constant fuel pressure, or pressure drop across conduits 17, thereby providing for satisfactory atomization of fuel under selected operating conditions. Prior to the development of the variable-area nozzle, it was found that in a single or a plurality of fixed fuel inlets such as 17, the high fuel pressure required to deliver increased amounts of fuel was responsible for too high a degree of atomization, and the low fuel pressure required for delivery of relatively small amounts of fuel, was responsible for too low a degree of atomization, in either case causing combustion instability. As described, the variable-area injection nozzle prior to my invention operates satisfactorily so long as the viscosity of the fuel in conduits 18 and 19 is substantially constant. However, when viscosity of the fuel varies, as for example when it increases, a higher pressure drop is required across fuel inlets 17 in order to achieve satisfactory atomization than is permitted by bellows 27 and spring 34 alone, operating in conjunction with piston 23. As a result, when fuel viscosity increases, particularly as a result of a temperature change in the fuel of from 20 to 125° F. and in some cases higher, atomization as a result of such a change is not satisfactory. In the improved variable-area fuel nozzle of my invention, I have provided temperature sensitive element 36, collar-guide 29, and the like as described to respond to any viscosity change in fuel in conduits 18, manifest by the change in temperature of the fuel therein, and to accordingly operate in conjunction with bellows assembly 27 so as to provide the increase in pressure drop required by the increased liquid fuel viscosity, against the otherwise normal action of bellows 27 and spring 34 to prevent such an increase from taking place. Accordingly, temperature sensitive element 36 in response to a decrease in temperature, i. e., an increase in viscosity, contracts causing collar-guide 29 to move against spring 34, thereby lowering the position of piston 23 in chamber 14 to an extent to provide fewer openings 17 resulting in the increased pressure drop necessary for maintaining the desired atomization of the higher viscosity fuel. Conversely, in response to an increase in temperature, i. e., a decrease in viscosity of the fuel in conduits 18, the fuel pressure is restored to the original or decreased further dependent on the extent of viscosity change encountered. It is within the intended scope of my invention to provide for the use of any suitable temperature sensitive means which can be adapted to cause piston 23 to rise or be lowered in chamber 14 in response to viscosity change of fuel in conduits 18, manifest by a change in fuel temperature.

As will be evident to those skilled in the art, various modifications can be made or followed, in the light of the foregoing disclosure and discussion, without departing from the spirit or scope of the disclosure or from the scope of the claims.

I claim:

1. A fuel injection nozzle comprising in combination a closed housing; a cylindrical chamber in an end closure member of said housing; an orifice in an end portion of said cylindrical chamber communicating the interior of said chamber with a point outside said housing; a plurality of conduits each disposed to admit fluid into said cylindrical chamber tangentially against the inner wall thereof, and terminating at said inner wall at points longitudinally spaced apart thereon; a plurality of fuel conduits in said housing for admitting liquid fuel, and communicating with the first said conduits; a piston member axially disposed in said cylindrical chamber, closing same and axially movable therein; a pressure sensitive bellows in said housing coaxial with said piston and connected at one end with said piston, and having its outer surface in communication with the interior of the last said conduits; a collar in said housing disposed to be moved axially therein; said bellows at its end farthest from said piston encompassing an end portion of said collar; a spring in said bellows contacting said collar at one end and said piston at the other end; a temperature sensitive element in said housing responsive to temperature change in the interior of the last said conduits and operatively connected to said collar to move same to compress said spring when said temperature decreases and relieve said spring when said temperature increases; and conduit means for communicating the interior of said bellows with a point outside of said housing.

2. The combination of claim 1 wherein said temperature sensitive element is a bimetallic strip.

3. In a housed variable-area fuel injection nozzle of the vortex-type, including liquid fuel inlet conduit means to the nozzle housing and a pressure sensitive bellows augmented by a helical spring which actuates means to vary available area of passageways for admitting liquid fuel from sid inlet conduit means into the vortex chamber in response to liquid fuel inlet pressure, so as to control pressure drop across said passageways, thereby providing for a predetermined degree of fuel atomization, the improvement comprising an axially movable collar in said housing disposed in contact with said spring and coaxially therewith, and a temperature sensitive element in said housing operatively connected with said collar to move same in response to a change of temperature in the said fuel inlet conduit means said element being adapted to compress said spring and thereby decrease said area in response to a decrease of said temperature and to relieve said spring and thereby increase said area in response to an increase of said temperature.

4. The improvement of claim 3 wherein said temperature sensitive means is a bimetallic strip.

5. In a housed variable-area fuel injection nozzle of the vortex-type, including liquid fuel inlet conduit means to the nozzle housing, and pressure sensitive means to vary available area of passageways for admitting liquid fuel from said inlet conduit means into the vortex chamber in response to liquid fuel inlet pressure, so as to control pressure drop across said passageways, thereby providing for a predetermined degree of fuel atomization, the improvement comprising, a temperature sensitive means in said housing responsive to a change of temperature in said liquid fuel inlet conduit means, and means for communicating such resulting response to said pressure sensitive means, so as to alter the action of same to increase said pressure drop when said temperature decreases and to decrease said pressure drop when said temperature increases.

HOMER M. FOX.

References Cited in the file of this patent

UNITED STATES PATENTS

| Number | Name | Date |
|---|---|---|
| Re. 20,027 | Wettstein | June 30, 1936 |
| 1,662,289 | Whitehead | Mar. 13, 1928 |
| 1,813,122 | Moore | July 7, 1931 |
| 2,513,720 | Hallinan | July 4, 1950 |

FOREIGN PATENTS

| Number | Country | Date |
|---|---|---|
| 581,367 | Great Britain | Oct. 10, 1946 |